United States Patent [19]
Lin et al.

[11] Patent Number: 5,636,293
[45] Date of Patent: Jun. 3, 1997

[54] MULTIPLE MODULE ARCHITECTURE FOR IMPLEMENTING FULL SEARCH BLOCK MATCHING

[75] Inventors: Vincent M. S. Lin, Taipei; Foo-Ming Lee, Kaohsiung, both of Taiwan

[73] Assignee: Industrial Technology Research Institute, Chutung, Taiwan

[21] Appl. No.: 362,748

[22] Filed: Dec. 22, 1994

Related U.S. Application Data

[63] Continuation of Ser. No. 23,907, Feb. 22, 1993, abandoned.
[51] Int. Cl.$^6$ ..................................................... G06K 9/00
[52] U.S. Cl. .............................................. 382/236; 382/251
[58] Field of Search .................................. 382/205, 209, 382/217, 218, 232, 236, 238, 239, 240, 244, 248, 251, 268; 358/400, 401, 405, 406, 425, 426, 443; 364/480, 481; 348/699, 420, 416, 413, 422, 500; 341/172

[56] References Cited

U.S. PATENT DOCUMENTS

| | | | |
|---|---|---|---|
| 4,897,720 | 1/1990 | Wu et al. | 358/136 |
| 4,937,666 | 6/1990 | Yang | 382/27 |
| 5,030,953 | 7/1991 | Chiang | 358/105 |
| 5,036,391 | 7/1991 | Auvray et al. | 348/420 |

OTHER PUBLICATIONS

L. De Vos et al, "VLSI Architectures for th Full–Search Blockmatching Algorithm", IEEE ICASSP, pp. 1687–1690 (1989).

T. Komarek et al, "Array Architecture for Block Matching Algorithms", IEEE, Trans. on Circ. and Systesm, vol. 36, No. 10, Oct. 1989, pp. 1301–1308.

L. De Vos et al, "Parameterizable VLSI Architecture . . . Algorithm", IEEE Trans. on Cir. and Systems, vol. 36, No. 10, Oct. 1989 pp. 1309–1316.

Kun–Min Yang et al, "A Family of VLSI Designs for the Motion Compensation . . . " IEEE Trans. on Cir. and Systems, vol. 36, No. 10, Oct. 1989, pp. 1317–1325.

Primary Examiner—Leo Boudreau
Assistant Examiner—Bijan Tadayon
Attorney, Agent, or Firm—Meltzer, Lippe, Goldstein et al.

[57] ABSTRACT

A circuit implementation of a block matching algorithm includes a plurality of modules. Each module is a one-dimensional systolic array. The modules can be connected in tandem to increase the power of computation so that the best match of a current block in a search window can be obtained more rapidly without increasing the number of input ports. Further, the modules can be connected in tandem so as to enable the size of the search window to be increased.

24 Claims, 13 Drawing Sheets

FIG. 3

| CYCLE | INPUT DATA | | | PE0 | PE1 | PE2 | | PE14 | PE15 |
|---|---|---|---|---|---|---|---|---|---|
| | C | P | P' | | | | | | |
| 0 | a(0, 0) b(0, 0) | | | a(0, 0)-b(0, 0) | | | | | |
| 1 | a(0, 1) b(0, 1) | | | a(0, 1)-b(0, 1) | a(0, 0)-b(0, 1) | | | | |
| 2 | a(0, 2) b(0, 2) | | | a(0, 2)-b(0, 2) | a(0, 1)-b(0, 2) | a(0, 0)-b(0, 2) | | | |
| ⋮ | ⋮ | | | ⋮ | ⋮ | ⋮ | | | |
| 12 | a(0,12) b(0,12) | | | a(0,12)-b(0,12) | a(0,11)-b(0,12) | a(0,10)-b(0,12) | | | |
| 13 | a(0,13) b(0,13) | | | a(0,13)-b(0,13) | a(0,12)-b(0,13) | a(0,11)-b(0,13) | | | |
| 14 | a(0,14) b(0,14) | | | a(0,14)-b(0,14) | a(0,13)-b(0,14) | a(0,12)-b(0,14) | | a(0, 0)-b(0,14) | |
| 15 | a(0,15) b(0,15) | | | a(0,15)-b(0,15) | a(0,14)-b(0,15) | a(0,13)-b(0,15) | | a(0, 1)-b(0,15) | a(0, 0)-b(0,15) |
| 16×1 + 0 | a(1, 0) b(1, 0) | | b(0,16) | a(1, 0)-b(1, 0) | a(0,15)-b(0,16) | a(0,14)-b(0,16) | | a(0, 2)-b(0,16) | a(0, 1)-b(0,16) |
| 16×1 + 1 | a(1, 1) b(1, 1) | | b(0,17) | a(1, 1)-b(1, 1) | a(1, 0)-b(1, 1) | a(0,15)-b(0,17) | 100 | a(0, 3)-b(0,17) | a(0, 2)-b(0,17) |
| 16×1 + 2 | a(1, 2) b(1, 2) | | b(0,18) | a(1, 2)-b(1, 2) | a(1, 1)-b(1, 2) | a(1, 0)-b(1, 2) | | a(0, 4)-b(0,18) | a(0, 3)-b(0,18) |
| | | | | | | | | a(0, 5)-b(0,19) | a(0, 4)-b(0,19) |
| ⋮ | ⋮ | | ⋮ | ⋮ | ⋮ | ⋮ | | ⋮ | ⋮ |
| 16×1 +12 | a(1,12) b(1,12) | | b(0,28) | a(1,12)-b(1,12) | a(1,11)-b(1,12) | a(1,10)-b(1,12) | | | |
| 16×1 +13 | a(1,13) b(1,13) | | b(0,29) | a(1,13)-b(1,13) | a(1,12)-b(1,13) | a(1,11)-b(1,13) | | a(1,15)-b(0,29) | a(0,14)-b(0,29) |
| 16×1 +14 | a(1,14) b(1,14) | | b(0,30) | a(1,14)-b(1,14) | a(1,13)-b(1,14) | a(1,12)-b(1,14) | | a(1, 0)-b(1,14) | a(0,15)-b(0,30) |
| 16×1 +15 | a(1,15) b(1,15) | | | a(1,15)-b(1,15) | a(1,14)-b(1,15) | a(1,13)-b(1,15) | | a(1, 1)-b(1,15) | a(1, 0)-b(1,15) |
| 16×2 + 0 | a(2, 0) b(2, 0) | | b(1,16) | a(2, 0)-b(2, 0) | a(1,15)-b(1,16) | a(1,14)-b(1,16) | | a(1, 2)-b(1,16) | a(1, 1)-b(1,16) |
| 16×2 + 1 | a(2, 1) b(2, 1) | | b(1,17) | a(2, 1)-b(2, 1) | a(2, 0)-b(2, 1) | a(1,15)-b(1,17) | | a(1, 3)-b(1,17) | a(1, 2)-b(1,17) |
| 16×2 + 2 | a(2, 2) b(2, 2) | | b(1,18) | a(2, 2)-b(2, 2) | a(2, 1)-b(2, 2) | a(2, 0)-b(2, 2) | | a(1, 4)-b(1,18) | a(1, 3)-b(1,18) |
| | | | | | | | | a(1, 5)-b(1,19) | a(1, 4)-b(1,19) |
| ⋮ | ⋮ | | ⋮ | ⋮ | ⋮ | ⋮ | | ⋮ | ⋮ |
| 16×2 +12 | a(2,12) b(2,12) | | b(1,28) | a(2,12)-b(2,12) | a(2,11)-b(2,12) | a(2,10)-b(2,12) | | | |
| 16×2 +13 | a(2,13) b(2,13) | | b(1,29) | a(2,13)-b(2,13) | a(2,12)-b(2,13) | a(2,11)-b(2,13) | | a(1,15)-b(1,29) | a(1,14)-b(1,29) |
| 16×2 +14 | a(2,14) b(2,14) | | b(1,30) | a(2,14)-b(2,14) | a(2,13)-b(2,14) | a(2,12)-b(2,14) | | a(2, 0)-b(2,14) | a(1,15)-b(1,30) |
| 16×2 +15 | a(2,15) b(2,15) | | | a(2,15)-b(2,15) | a(2,14)-b(2,15) | a(2,13)-b(2,15) | | a(2, 1)-b(2,15) | a(2, 0)-b(2,15) |
| ⋮ | ⋮ | | ⋮ | ⋮ | ⋮ | ⋮ | | ⋮ | ⋮ |
| 16×15+ 0 | a(15, 0) b(15, 0) | | b(14,16) | a(15, 0)-b(15, 0) | a(14,15)-b(14,16) | a(14,14)-b(14,16) | | a(14, 2)-b(14,16) | a(14, 1)-b(14,16) |
| 16×15+ 1 | a(15, 1) b(15, 1) | | b(14,17) | a(15, 1)-b(15, 1) | a(15, 0)-b(15, 1) | a(14,15)-b(14,17) | | a(14, 3)-b(14,17) | a(14, 2)-b(14,17) |
| 16×15+ 2 | a(15, 2) b(15, 2) | | b(14,18) | a(15, 2)-b(15, 2) | a(15, 1)-b(15, 2) | a(15, 0)-b(15, 2) | | a(14, 4)-b(14,18) | a(14, 3)-b(14,18) |
| | | | | | | | | a(14, 5)-b(14,19) | a(14, 4)-b(14,19) |
| ⋮ | ⋮ | | ⋮ | ⋮ | ⋮ | ⋮ | | ⋮ | ⋮ |
| 16×15+12 | a(15,12) b(15,12) | | b(14,28) | a(15,12)-b(15,12) | a(15,11)-b(15,12) | a(15,10)-b(15,12) | | | |
| 16×15+13 | a(15,13) b(15,13) | | b(14,29) | a(15,13)-b(15,13) | a(15,12)-b(15,13) | a(15,11)-b(15,13) | | a(14,15)-b(14,29) | a(14,14)-b(14,29) |
| 16×15+14 | a(15,14) b(15,14) | | b(14,30) | a(15,14)-b(15,14) | a(15,13)-b(15,14) | a(15,12)-b(15,14) | | a(15, 0)-b(15,14) | a(14,15)-b(15,14) |
| 16×15+15 | a(15,15) b(15,15) | | | a(15,15)-b(15,15) | a(15,14)-b(15,15) | a(15,13)-b(15,15) | | a(15, 1)-b(15,15) | a(15, 0)-b(15,15) |
| 16×16+ 0 | a(0, 0) b(1, 0) | b(15,16) | a(0, 0)-b(1, 0) | a(15,15)-b(15,16) | a(15,14)-b(15,16) | | | a(15, 2)-b(15,16) | a(15, 1)-b(15,16) |
| 16×16+ 1 | a(0, 1) b(1, 1) | b(15,17) | a(0, 1)-b(1, 1) | a(0, 0)-b(1, 1) | a(15,15)-b(15,17) | | 100 | a(15, 3)-b(15,17) | a(15, 2)-b(15,17) |
| 16×16+ 2 | a(0, 2) b(1, 2) | b(15,18) | a(0, 2)-b(1, 2) | a(0, 1)-b(1, 2) | a(0, 0)-b(1, 2) | | | a(15, 4)-b(15,18) | a(15, 3)-b(15,18) |
| | | | | | | | | a(15, 5)-b(15,19) | |
| ⋮ | ⋮ | | ⋮ | ⋮ | ⋮ | ⋮ | | ⋮ | ⋮ |
| 16×16+12 | a(0,12) b(1,12) | c(15,28) | a(0,12)-b(1,12) | a(0,11)-b(1,12) | a(0,10)-b(1,12) | | | | a(15,13)-b(15,28) |
| 16×16+13 | a(0,13) b(1,13) | c(15,29) | a(0,13)-b(1,13) | a(0,12)-b(1,13) | a(0,11)-b(1,13) | | | a(15,15)-b(15,29) | a(15,14)-b(15,29) |
| 16×16+14 | a(0,14) b(1,14) | c(15,30) | a(0,14)-b(1,14) | a(0,13)-b(1,14) | a(0,12)-b(1,14) | | | a(0, 0)-b(1,14) | a(15,15)-b(1,14) |
| 16×16+15 | a(0,15) b(1,15) | | a(0,15)-b(1,15) | a(0,14)-b(1,15) | a(0,13)-b(1,15) | | | a(0, 1)-b(1,15) | a(0, 0)-b(1,15) |

▓ DON'T CARE

| CYCLE | INPUT DATA | | | |
|---|---|---|---|---|
| | C | P | P' | P'' |
| 0 | a( 0, 0) | b( 0, 0) | | |
| 1 | a( 0, 1) | b( 0, 1) | | |
| 2 | a( 0, 2) | b( 0, 2) | | |
| ⋮ | ⋮ | ⋮ | | |
| 12 | a( 0,12) | b( 0,12) | | |
| 13 | a( 0,13) | b( 0,13) | | |
| 14 | a( 0,14) | b( 0,14) | | |
| 15 | a( 0,15) | b( 0,15) | | |
| 16x1 + 0 | a( 1, 0) | b( 1, 0) | b( 0,16) | |
| 16x1 + 1 | a( 1, 1) | b( 1, 1) | b( 0,17) | |
| 16x1 + 2 | a( 1, 2) | b( 1, 2) | b( 0,18) | |
| ⋮ | ⋮ | ⋮ | | |
| 16x1 +12 | a( 1,12) | b( 1,12) | b( 0,28) | |
| 16x1 +13 | a( 1,13) | b( 1,13) | b( 0,29) | |
| 16x1 +14 | a( 1,14) | b( 1,14) | b( 0,30) | |
| 16x1 +15 | a( 1,15) | b( 1,15) | b( 0,31) | |
| 16x2+ 0 | a( 2, 0) | b( 2, 0) | b( 0,16) | b( 0,32) |
| 16x2+ 1 | a( 2, 1) | b( 2, 1) | b( 1,17) | b( 0,33) |
| 16x2+ 2 | a( 2, 2) | b( 2, 2) | b( 1,18) | b( 0,34) |
| ⋮ | ⋮ | ⋮ | | |
| 16x2+12 | a( 2,12) | b( 2,12) | b( 1,28) | b( 0,44) |
| 16x2+13 | a( 2,13) | b( 2,13) | b( 1,29) | b( 0,45) |
| 16x2+14 | a( 2,14) | b( 2,14) | b( 1,30) | b( 0,46) |
| 16x2+15 | a( 2,15) | b( 2,15) | b( 1,31) | ▓ |
| ⋮ | ⋮ | ⋮ | | |
| 16x15+ 0 | a(15, 0) | b(15, 0) | b(14,16) | b(13,32) |
| 16x15+ 1 | a(15, 1) | b(15, 1) | b(14,17) | b(13,33) |
| 16x15+ 2 | a(15, 2) | b(15, 2) | b(14,18) | b(13,34) |
| ⋮ | ⋮ | ⋮ | | |
| 16x15+12 | a(15,12) | b(15,12) | b(14,28) | b(13,44) |
| 16x15+13 | a(15,13) | b(15,13) | b(14,29) | b(13,45) |
| 16x15+14 | a(15,14) | b(15,14) | b(14,30) | b(13,46) |
| 16x15+15 | a(15,15) | b(15,15) | b(14,31) | ▓ |
| 16x16+ 0 | a( 1, 0) | b( 1, 0) | b(15,16) | b(14,32) |
| 16x16+ 1 | a( 1, 1) | b( 1, 1) | b(15,17) | b(14,33) |
| 16x16+ 2 | a( 1, 2) | b( 1, 2) | b(15,18) | b(14,34) |
| ⋮ | ⋮ | ⋮ | | |
| 16x16+12 | a( 1,12) | b( 1,12) | b(15,28) | b(14,44) |
| 16x16+13 | a( 1,13) | b( 1,13) | b(15,29) | b(14,45) |
| 16x16+14 | a( 1,14) | b( 1,14) | b(15,30) | b(14,46) |
| 16x16+15 | a( 1,15) | b( 1,15) | b(15,31) | ▓ |
| 16x17+ 0 | a( 2, 0) | b( 2, 0) | b( 1,16) | b(15,32) |
| 16x17+ 1 | a( 2, 1) | b( 2, 1) | b( 1,17) | b(15,33) |
| 16x17+ 2 | a( 2, 2) | b( 2, 2) | b( 1,18) | b(15,34) |
| ⋮ | ⋮ | ⋮ | | |
| 16x17+12 | a( 2,12) | b( 2,12) | b( 1,28) | b(15,44) |
| 16x17+13 | a( 2,13) | b( 2,13) | b( 1,29) | b(15,45) |
| 16x17+14 | a( 2,14) | b( 2,14) | b( 1,30) | b(15,46) |
| 16x17+15 | a( 2,15) | b( 2,15) | b( 1,31) | ▓ |

FIG. 11

| CYCLE | INPUT DATA | | | |
|---|---|---|---|---|
| | C | P | P' | P'' |
| 0 | a(0, 0) | b(0, 0) | | |
| 1 | a(0, 1) | b(0, 1) | | |
| ⋮ | ⋮ | ⋮ | | |
| 14 | a(0,14) | b(0,14) | | |
| 15 | a(0,15) | b(0,15) | | |
| 16x1 + 0 | a(1, 0) | b(1, 0) | b(0,16) | |
| 16x1 + 1 | a(1, 1) | b(1, 1) | b(0,17) | |
| ⋮ | | | | |
| 16x1 +14 | a(1,14) | b(1,14) | b(0,30) | |
| 16x1 +15 | a(1,15) | b(1,15) | b(0,31) | |
| 16x2 + 0 | a(2, 0) | b(2, 0) | b(1,16) | b(0,32) |
| 16x2 + 1 | a(2, 1) | b(2, 1) | b(1,17) | b(0,33) |
| ⋮ | | | | |
| 16x2 +14 | a(2,14) | b(2,14) | b(1,30) | b(0,46) |
| 16x2 +15 | a(2,15) | b(2,15) | b(1,31) | |
| ⋮ | ⋮ | ⋮ | | |
| 16x15+ 0 | a(15, 0) | b(15, 0) | b(14,16) | b(13,32) |
| 16x15+ 1 | a(15, 1) | b(15, 1) | b(14,17) | b(13,33) |
| ⋮ | | | | |
| 16x15+14 | a(15,14) | b(15,14) | b(14,30) | b(13,46) |
| 16x15+15 | a(15,15) | b(15,15) | b(14,31) | |
| 16x16+ 0 | | b(16, 0) | b(15,16) | b(14,32) |
| 16x16+ 1 | | b(16, 1) | b(15,17) | b(14,33) |
| ⋮ | | | | |
| 16x16+14 | | b(16,14) | b(15,30) | b(14,46) |
| 16x16+15 | | b(16,15) | b(15,31) | |
| 16x17+ 0 | | b(17, 0) | b(16,16) | b(15,32) |
| 16x17+ 1 | | b(17, 1) | b(16,17) | b(15,33) |
| ⋮ | | | | |
| 16x17+14 | | b(17,14) | b(16,30) | b(15,46) |
| 16x17+15 | | b(17,15) | b(16,31) | |
| 16x18+ 0 | | b(18, 0) | b(17,16) | b(16,32) |
| 16x18+ 1 | | b(18, 1) | b(17,17) | b(16,33) |
| ⋮ | | | | |
| 16x18+14 | | b(18,14) | b(17,30) | b(16,46) |
| 16x18+15 | | b(18,15) | b(17,31) | |
| 16x19+ 0 | a(1, 0) | b(1, 0) | b(18,16) | b(17,32) |
| 16x19+ 1 | a(1, 1) | b(1, 1) | b(18,17) | b(17,33) |
| ⋮ | | | | |
| 16x19+14 | a(1,14) | b(1,14) | b(18,30) | b(17,46) |
| 16x19+15 | a(1,15) | b(1,15) | b(18,31) | |
| 16x20+ 0 | a(2, 0) | b(2, 0) | b(1,16) | b(18,32) |
| 16x20+ 1 | a(2, 1) | b(2, 1) | b(1,17) | b(18,33) |
| ⋮ | | | | |
| 16x20+14 | a(2,14) | b(2,14) | b(1,30) | b(18,46) |
| 16x20+15 | a(2,15) | b(2,15) | b(1,31) | |
| 16x21+ 0 | a(3, 0) | b(3, 0) | b(2,16) | b(1,32) |
| 16x21+ 1 | a(3, 1) | b(3, 1) | b(2,17) | b(1,33) |
| ⋮ | | | | |
| 16x21+14 | a(3,14) | b(3,14) | b(2,30) | b(1,46) |
| 16x21+15 | a(3,15) | b(3,15) | b(2,31) | |

FIG. 12

| CYCLE | MODULE 1A | | | MODULE 2A | | | MODULE 3A | | | MODULE 4A | | |
|---|---|---|---|---|---|---|---|---|---|---|---|---|
| | C | P | P' | C | P | P' | C | P | P' | C | P | P' |
| 0 | a(0, 0) | b(0, 0) | | | | | | | | | | |
| 1 | a(0, 1) | b(0, 1) | | | | | | | | | | |
| 2 | a(0, 2) | b(0, 2) | | | | | | | | | | |
| ⋮ | ⋮ | ⋮ | | | | | | | | | | |
| 15 | a(0,15) | b(0,15) | | | | | | | | | | |
| 16×1 + 0 | a(1, 0) | b(1, 0) | b(0,16) | a(0, 0) | b(1, 0) | | | | | | | |
| 16×1 + 1 | a(1, 1) | b(1, 1) | b(0,17) | a(0, 1) | b(1, 1) | | | | | | | |
| 16×1 + 2 | a(1, 2) | b(1, 2) | b(0,18) | a(0, 2) | b(1, 2) | | | | | | | |
| ⋮ | ⋮ | ⋮ | ⋮ | ⋮ | ⋮ | | | | | | | |
| 16×1 +15 | a(1,15) | b(1,15) | b(0,31) | a(0,15) | b(1,15) | | | | | | | |
| 16×2 + 0 | | | | a(1, 0) | b(2, 0) | b(1,16) | a(0, 0) | b(2, 0) | | | | |
| 16×2 + 1 | | | | a(1, 1) | b(2, 1) | b(1,17) | a(0, 1) | b(2, 1) | | | | |
| 16×2 + 2 | | | | a(1, 2) | b(2, 2) | b(1,18) | a(0, 2) | b(2, 2) | | | | |
| ⋮ | | ⋮ | | ⋮ | ⋮ | ⋮ | ⋮ | ⋮ | | | | |
| 16×2 +15 | | | | a(1,15) | b(2,15) | b(1,31) | a(0,15) | b(2,15) | | | | |
| 16×3 + 0 | | | | | | | a(1, 0) | b(3, 0) | b(2,16) | a(0, 0) | b(3, 0) | |
| 16×3 + 1 | | | | | | | a(1, 1) | b(3, 1) | b(2,17) | a(0, 1) | b(3, 1) | |
| 16×3 + 2 | | | | | | | a(1, 2) | b(3, 2) | b(2,18) | a(0, 2) | b(3, 2) | |
| ⋮ | | ⋮ | | | ⋮ | | ⋮ | ⋮ | ⋮ | ⋮ | ⋮ | |
| 16×3 +15 | | | | | | | a(1,15) | b(3,15) | b(2,31) | a(0,15) | b(3,15) | |
| 16×4 + 0 | | | | | | | | | | a(1, 0) | b(4, 0) | b(3,16) |
| 16×4 + 1 | | | | | | | | | | a(1, 1) | b(4, 1) | b(3,17) |
| 16×4 + 2 | | | | | | | | | | a(1, 2) | b(4, 2) | b(3,18) |
| ⋮ | | ⋮ | | | ⋮ | | | ⋮ | | ⋮ | ⋮ | ⋮ |
| 16×4 +15 | | | | | | | | | | a(1,15) | b(4,15) | b(3,31) |
| ⋮ | ⋮ | | | ⋮ | | | ⋮ | | | ⋮ | | |
| 16×15 + 0 | a(15, 0) | b(15, 0) | b(14,16) | a(14, 0) | b(15, 0) | b(14,16) | | | | | | |
| 16×15 + 1 | a(15, 1) | b(15, 1) | b(14,17) | a(14, 1) | b(15, 1) | b(14,17) | | | | | | |
| 16×15 + 2 | a(15, 2) | b(15, 2) | b(14,18) | a(14, 2) | b(15, 2) | b(14,18) | | ⋮ | | | ⋮ | |
| ⋮ | ⋮ | ⋮ | ⋮ | ⋮ | ⋮ | ⋮ | | | | | | |
| 16×15 +15 | a(15,15) | b(15,15) | b(14,31) | a(14,15) | b(15,15) | b(14,31) | | | | | | |
| 16×16 + 0 | | b(15,16) | | a(15, 0) | b(16, 0) | b(15,16) | a(14, 0) | b(16, 0) | b(15,16) | | | |
| 16×16 + 1 | | b(15,17) | | a(15, 1) | b(16, 1) | b(15,17) | a(14, 1) | b(16, 1) | b(15,17) | | | |
| 16×16 + 2 | | b(15,18) | | a(15, 2) | b(16, 2) | b(15,18) | a(14, 2) | b(16, 2) | b(15,18) | | ⋮ | |
| ⋮ | | ⋮ | | ⋮ | ⋮ | ⋮ | ⋮ | ⋮ | ⋮ | | | |
| 16×16 +15 | | b(15,31) | | a(15,15) | b(16,15) | b(15,31) | a(14,15) | b(16,15) | b(15,31) | | | |
| 16×17 + 0 | | | | | b(16,16) | | a(15, 0) | b(17, 0) | b(16,16) | a(14, 0) | b(17, 0) | b(16,16) |
| 16×17 + 1 | | | | | b(16,17) | | a(15, 1) | b(17, 1) | b(16,17) | a(14, 1) | b(17, 1) | b(16,17) |
| 16×17 + 2 | | | | | b(16,18) | | a(15, 2) | b(17, 2) | b(16,18) | a(14, 2) | b(17, 2) | b(16,18) |
| ⋮ | | | | | ⋮ | | ⋮ | ⋮ | ⋮ | ⋮ | ⋮ | ⋮ |
| 16×17 +15 | | | | | b(16,31) | | a(15,15) | b(17,15) | b(16,31) | a(14,15) | b(17,15) | b(16,31) |
| 16×18 + 0 | | | | | | | | b(17,16) | | a(15, 0) | b(18, 0) | b(17,16) |
| 16×18 + 1 | | | | | | | | b(17,17) | | a(15, 1) | b(18, 1) | b(17,17) |
| 16×18 + 2 | | | | | | | | b(17,18) | | a(15, 2) | b(18, 2) | b(17,18) |
| ⋮ | | | | | | | | ⋮ | | ⋮ | ⋮ | ⋮ |
| 16×18 +15 | | | | | | | | b(17,31) | | a(15,15) | b(18,15) | b(17,31) |
| 16×19 + 0 | a(1, 0) | b(4, 0) | | | | | | | | | | b(18,16) |
| 16×19 + 1 | a(1, 1) | b(4, 1) | | | | | | | | | | b(18,17) |
| 16×19 + 2 | a(1, 2) | b(4, 2) | | | | | | | | | | b(18,18) |
| ⋮ | ⋮ | ⋮ | | | | | | | | | | ⋮ |
| 16×19 +15 | a(1,15) | b(4,15) | | | | | | | | | | b(18,31) |

FIG. 13

| CYCLE | MODULE 1B | | | MODULE 2B | | | MODULE 3B | | | MODULE 4B | | |
|---|---|---|---|---|---|---|---|---|---|---|---|---|
| | C | P | P' | C | P | P' | C | P | P' | C | P | P' |
| 0<br>1<br>2<br>⋮<br>15 | | | | | | | | | | | | |
| 16x1 + 0<br>16x1 + 1<br>16x1 + 2<br>⋮<br>16x1 +15 | a(0, 0)<br>a(0, 1)<br>a(0, 2)<br>⋮<br>a(0,15) | b(0,16)<br>b(0,17)<br>b(0,18)<br>⋮<br>b(0,31) | | | | | | | | | | |
| 16x2 + 0<br>16x2 + 1<br>16x2 + 2<br>⋮<br>16x2 +15 | a(1, 0)<br>a(1, 1)<br>a(1, 2)<br>⋮<br>a(1,15) | b(1,16)<br>b(1,17)<br>b(1,18)<br>⋮<br>b(1,31) | b(0,32)<br>b(0,33)<br>b(0,34)<br>⋮<br>b(0,47) | a( 0, 0)<br>a( 0, 1)<br>a( 0, 2)<br>⋮<br>a( 0,15) | b( 1,16)<br>b( 1,17)<br>b( 1,18)<br>⋮<br>b( 1,31) | | | | | | | |
| 16x3 + 0<br>16x3 + 1<br>16x3 + 2<br>⋮<br>16x3 +15 | | | | a( 1, 0)<br>a( 1, 1)<br>a( 1, 2)<br>⋮<br>a( 1,15) | b( 2,16)<br>b( 2,17)<br>b( 2,18)<br>⋮<br>b( 2,31) | b( 0,32)<br>b( 0,33)<br>b( 0,34)<br>⋮<br>b( 0,47) | a( 0, 0)<br>a( 0, 1)<br>a( 0, 2)<br>⋮<br>a( 0,15) | b( 2,16)<br>b( 2,17)<br>b( 2,18)<br>⋮<br>b( 2,31) | | | | |
| 16x4 + 0<br>16x4 + 1<br>16x4 + 2<br>⋮<br>16x4 +15 | | | | | | | a( 1, 0)<br>a( 1, 1)<br>a( 1, 2)<br>⋮<br>a( 1,15) | b( 3,16)<br>b( 3,17)<br>b( 3,18)<br>⋮<br>b( 3,31) | b( 2,32)<br>b( 2,33)<br>b( 2,34)<br>⋮<br>b( 2,47) | a( 0, 0)<br>a( 0, 1)<br>a( 0, 2)<br>⋮<br>a( 0,15) | b( 3,16)<br>b( 3,17)<br>b( 3,18)<br>⋮<br>b( 3,31) | |
| 16x5 + 0<br>16x5 + 1<br>16x5 + 2<br>⋮<br>16x5 +15 | | | | | | | | | | a( 1, 0)<br>a( 1, 1)<br>a( 1, 2)<br>⋮<br>a( 1,15) | b( 4,16)<br>b( 4,17)<br>b( 4,18)<br>⋮<br>b( 4,31) | b( 3,32)<br>b( 3,33)<br>b( 3,34)<br>⋮<br>b( 3,47) |
| ⋮ | ⋮ | | | ⋮ | | | ⋮ | | | ⋮ | | |
| 16x16 + 0<br>16x16 + 1<br>16x16 + 2<br>⋮<br>16x16 +15 | a(15, 0)<br>a(15, 1)<br>a(15, 2)<br>⋮<br>a(15,15) | b(15,16)<br>b(15,17)<br>b(15,18)<br>⋮<br>b(15,31) | b(14,32)<br>b(14,33)<br>b(14,34)<br>⋮<br>b(14,47) | a(14, 0)<br>a(14, 1)<br>a(14, 2)<br>⋮<br>a(14,15) | b(15,16)<br>b(15,17)<br>b(15,18)<br>⋮<br>b(15,31) | b(14,32)<br>b(14,33)<br>b(14,34)<br>⋮<br>b(14,47) | | | | | | |
| 16x17 + 0<br>16x17 + 1<br>16x17 + 2<br>⋮<br>16x17 +15 | | | b(15,32)<br>b(15,33)<br>b(15,34)<br>⋮<br>b(15,47) | a(15, 0)<br>a(15, 1)<br>a(15, 2)<br>⋮<br>a(15,15) | b(16,16)<br>b(16,17)<br>b(16,18)<br>⋮<br>b(16,31) | b(15,32)<br>b(15,33)<br>b(15,34)<br>⋮<br>b(15,47) | a(14, 0)<br>a(14, 1)<br>a(14, 2)<br>⋮<br>a(14,15) | b(16,16)<br>b(16,17)<br>b(16,18)<br>⋮<br>b(16,31) | b(15,32)<br>b(15,33)<br>b(15,34)<br>⋮<br>b(15,47) | | | |
| 16x18 + 0<br>16x18 + 1<br>16x18 + 2<br>⋮<br>16x18 +15 | | | | | | b(16,32)<br>b(16,33)<br>b(16,34)<br>⋮<br>b(16,47) | a(15, 0)<br>a(15, 1)<br>a(15, 2)<br>⋮<br>a(15,15) | b(17,16)<br>b(17,17)<br>b(17,18)<br>⋮<br>b(17,31) | b(16,32)<br>b(16,33)<br>b(16,34)<br>⋮<br>b(16,47) | a(14, 0)<br>a(14, 1)<br>a(14, 2)<br>⋮<br>a(14,15) | b(17,16)<br>b(17,17)<br>b(17,18)<br>⋮<br>b(17,31) | b(16,32)<br>b(16,33)<br>b(16,34)<br>⋮<br>b(16,47) |
| 16x19 + 0<br>16x19 + 1<br>16x19 + 2<br>⋮<br>16x19 +15 | | | | | | | | | b(17,32)<br>b(17,33)<br>b(17,34)<br>⋮<br>b(17,47) | a(15, 0)<br>a(15, 1)<br>a(15, 2)<br>⋮<br>a(15,15) | b(18,16)<br>b(18,17)<br>b(18,18)<br>⋮<br>b(18,31) | b(17,32)<br>b(17,33)<br>b(17,34)<br>⋮<br>b(17,47) |
| 16x20 + 0<br>16x20 + 1<br>16x20 + 2<br>⋮<br>16x20 +15 | a( 1, 0)<br>a( 1, 1)<br>a( 1, 2)<br>⋮<br>a( 1,15) | b( 4,16)<br>b( 4,17)<br>b( 4,18)<br>⋮<br>b( 4,31) | | | | | | | | | | b(18,32)<br>b(18,33)<br>b(18,34)<br>⋮<br>b(18,47) |

MULTIPLE MODULE ARCHITECTURE FOR IMPLEMENTING FULL SEARCH BLOCK MATCHING

This is a continuation of application Ser. No. 08/023,907, filed Feb. 22, 1993, now abandoned.

FIELD OF THE INVENTION

The present invention relates to the compression of video signals. More particularly, the present invention relates to a multiple module architecture for implementing a full search block matching algorithm. Each module comprises a one-dimensional systolic array of processing elements. The block matching algorithm allows temporal redundancy to be eliminated from a video signal in real time and in a highly efficient manner.

BACKGROUND OF THE INVENTION

A full motion video sequence usually contains a significant amount of frame-to-frame redundancy. For video phone or teleconferencing applications, motion in the entire scene is usually low and successive frames are highly correlated. In such a case, interframe coding techniques can reduce the information redundancy in video sequences and achieve high data compression.

The block matching motion compensation algorithm is widely used in many video codecs to remove interframe redundancy. The basic idea in the block matching algorithm is to divide the current frame in the video sequence into blocks, and for each block to search for a best match position in a search window of the previous video frame.

The best match of the current block in the search window is determined by finding the minimum value of an error function, $$E = \sum_i \sum_j |a(i,j) - b(i+m_i, j+m_j)|^q$$

where the $a(i,j)$'s are pixel values of the current block of the current frame, the $b(i,j)$'s are the pixel values of the search window of the previous frame, i is a vertical coordinate index, j is a horizontal coordinate index, and $m_i, m_j$ represents a candidate displacement vector. The power factor q usually equals 1 or 2.

The displacement vector (i.e., value of $m_i$, $m_j$) which minimizes the error function E is called the motion vector.

The current block of the current video frame may be coded as follows. The difference between the current block and the best match block in the search window of the previous frame is obtained. This difference is then compressed using the Discrete Cosine Transform, quantization of transform coefficients and variable length coding. Given the motion vector information, the receiver can then reconstruct the current block using the available previous frame and the compressed block difference. The better the motion compensated prediction, the higher is the efficiency in compressing the block difference. Thus, the use of motion compensation results in a tremendous reduction in the amount of bits used to code a frame.

There are several ways in which the best match position of a current block of a current video frame can be found in a search window of a previous video frame. One method is the full search method in which the error function for every possible displacement of the current block in the search window is evaluated.

Currently, there are two types of architectures which can be used to implement a full search block matching algorithm. One architecture is a two-dimensional systolic array (see, e.g., IEEE ICASSP, pp. 1687–1690, 1989; IEEE Trans. on CAS, Vol. 36, No. 10, October, 1989, pp. 1309–1316; and IEEE Trans. on CAS, Vol. 36, No. 10, October 1989, pp. 1301–1308.) The two-dimensional systolic array architecture has a very high computation power and can be applied to video signals of high resolution or with a high sampling rate. The disadvantage of this architecture is that when implemented in a chip, the chip size is large and such chips are difficult to produce with reasonable yields given the current state of the art semiconductor processing technology.

The other type of architecture is the one-dimensional systolic array. (See, e.g., IEEE Trans. on CAS, Vol. 36, No. 10, pp. 1317–1325, Oct. 1989 and U.S. Pat. No. 4,897,720). This architecture has the advantage of a reasonable chip size.

The operation of the prior art one-dimensional systolic array is explained in greater detail below.

FIG. 1 shows a current video frame i and an immediately previous video frame i-1. Illustratively, the current video frame is coded by dividing the current frame i into N×N blocks. One such N×N block (i.e., the current block) of frame i is shown in FIG. 1. A search window for the previous video frame i-1 is also shown in FIG. 1. The search window comprises the pixels of the previous frame which correspond to the current block (shown as shaded in FIG. 1) and additional pixels in each direction. Thus, the search window has dimensions $(p+p+1+N)^2$. Illustratively, N=2p+2. Typically, N=16 and p=7.

In accordance with the full search technique, the search window of the previous frame is searched by placing the current block at the upper lefthand corner of the search window and calculating the error function with respect to the overlapped pixels of the search window. The current block is then moved pixel by pixel to the righthand boundary of the search window. At each step, the error function with respect to the overlapped pixels of the search window is calculated. The current block is then moved down one row of pixels in the search window, and the current block is then moved pixel by pixel from the left boundary of the search window to the righthand boundary. At each step the error function between the current block and the overlapped pixels of the search window is calculated. The current block is then moved down another row in the search window and then moved pixel by pixel from right to left. This process is continued until an error function is computed for all possible positions of the current block in the search window. (Hence the name, full search block matching algorithm.) The error functions for all positions (i.e., all possible values of $m_i$, $m_j$) are compared to find the best match block in the search window, i.e., the position of the current block in the search window with the minimum error.

A prior art circuit module in the form of a one-dimensional systolic array for preforming the full search block matching algorithm is shown in FIG. 2. The module 10 of FIG. 2 is a variation of the circuit disclosed in U.S. Pat. No. 4,897,720. The module 10 of FIG. 2 is efficient because it can compute in parallel the error functions for one row of positions of the current block in the search window.

The module 10 of FIG. 2 comprises three pixel inputs. An input C receives the pixels of the current block. An input P receives the pixels from the lefthand side of the search window (see FIG. 1) and an input P' receives the pixels from the righthand side of the search window. The sequence in which the pixels arrive at the inputs is described below.

The module 10 comprises a plurality of processing elements labeled PE-0, PE-1, . . . , PE-15. The number of processing elements is equal to 2p+2. Each processing element calculates the error function of one position of the current block in the search window. The processing elements take advantage of the fact that the error function calculations of adjacent positions of the current block in the search window utilize a significant number of pixel values in common. Thus, the processing elements can calculate the error functions for one row of positions of the current block in the search window in parallel.

The module 10 of FIG. 2 operates cyclically. FIG. 3 is a table which indicates the pixel inputs which are present at the C,P, and P' inputs for each cycle to calculate in parallel the error functions for one row of positions of the current block in the search window.

The pixels a(i,j) from the current block and b(i,j) from the search window arrive at the inputs C, P and P' in the order shown in FIG. 3.

In FIG. 3, the upper lefthand pixel of the current block is designated a(0,0). The pixel b(0,0) designates the upper lefthand pixel of the search window. In FIG. 3, the pixels shown are the pixels needed to calculate the error functions for the topmost row of positions of the current block in the search window.

FIG. 3 shows that the pixel values a(i,j) arrive at the input C in each cycle 0,1,2, in raster scan order. The pixels propagate serially down the chain of flipflops 12.

The module 10 comprises a set of multiplexers 14. Each of the multiplexers 14 has an output connected to one of the processing elements PE-0, PE-1, . . . , PE-15. Each multiplexer has two inputs which are the inputs P and P'. In each cycle, one of the two multiplexer inputs is connected to the associated processing element. The module 10 also includes a chain of flipflops 16. There is one flip-flop 16 associated with each multiplexer 14. The state of the associated flipflop 16 during a cycle determines whether the corresponding multiplexer input P' or P is connected to the associated processing element. As shown in FIG. 3, within each group of sixteen cycles is a line 100. At the start of each group of sixteen cycles the states of the flipflops 16 are reset via line 17. Then a signal propagates down the chain of flipflops 16 so that one additional flipflop has its state set in each succeeding cycle of the group of sixteen cycles. When the states of the flipflops 16 are established in this manner, the pixel b(i,j) present at the input P is broadcast to all processing elements to the left of the line 100 and the pixel b(i,j) present at the input P' is broadcast to all processing elements to the right of the line 100.

FIG. 3 also indicates the calculation performed by each processing element in each cycle. In each cycle, the difference between a particular pixel value a(i,j) and a particular pixel value b(i,j), received from the P or P' input depending on the states of the associated multiplexer, is obtained. The absolute value or square of the difference is obtained (depending on whether the power factor q=1 or q=2 is used in the error function formula) and the result is accumulated with results obtained in previous cycles until a complete error function is obtained. As indicated above, each processing element computes the error function for one position of the current block in the search window and the error functions for a whole row of positions are calculated in parallel.

At cycle 255, the processing element PE-0 completes the calculation of its error function. The uppermost one of the tristate devices 19 is enabled by an enable signal so that the error function can be transmitted to a comparator 30. The remaining processing elements PE-1, PE-2, . . . , PE-15 complete the calculation of their error functions in the succeeding fifteen cycles. The enable signal propagates down the chain of flipflops 20, so that in each of the succeeding cycle, a tristate buffer 19 is enabled and the corresponding error function is transmitted to the comparator 30. After all the error functions for all the positions of the current block in the search window have been determined, the comparator 30 outputs an indication of the position which is the best match, i.e., the position with the minimum error function.

With respect to the data flow of FIG. 3, it should be noted that the input of the pixels a(i,j) necessary to compute the error function of the topmost row of positions of the search window is completed at cycle 255. Thus, starting at cycle 256 the sequence of pixels a(i,j) repeat as these pixels are again needed in the computation of the second row of positions of the current block in the search window. Similarly, the pixels b(i,j) needed for the computation of second row are inputted at the input P starting at cycle 256. The pixels b(i,j) needed for the computation of the error function of the second row have their vertical coordinate index increased by one in comparison to the pixels used in the computation of the error function of the first row of positions. The pixels b(i,j) inputted at the input P' for the computation of the error function for the second row of positions start at cycle 272 (not shown in FIG. 3). It should be noted that the calculations to the left of the lowermost line 100 of FIG. 3 belong to the computation of the error functions for the second row of positions.

The above-described operation of the module 10 of FIG. 2 is repeated for each row of positions of the current block in the search window. In this manner the one-dimensional systolic array which forms the module 10 of FIG. 2 carries out a full search block matching algorithm.

As indicated above, in the module 10 of FIG. 2 pixel values of the current block are transmitted serially from one processing element to the next in the one-dimensional systolic array, while in each cycle, search window pixels are broadcast from the P and P' inputs to a particular number of processing elements depending on the state of the flipflops 16. In an alternative one-dimensional systolic array, pixel values from the current block may be broadcast to the processing elements, while search window pixels are transmitted serially from one processing element to the next.

It is an object of the present invention to combine a plurality of one-dimensional systolic array modules to increase the computation power. (For these interconnections, the flipflops 120 and 200 are added at the bottom of chains 12 and 20. These extra flipflops are not needed in the conventional one-dimensional systolic array modules, but rather permit a plurality of such modules to be connected in tandem.)

In particular, it is an object of the present invention to combine a plurality of one dimensional systolic array modules to permit the error functions of a plurality of rows of positions of the current block in the search window to be calculated in parallel. It is also an object of the invention to combine a plurality of one dimensional systolic array modules to increase the size of the search area.

SUMMARY OF THE INVENTION

In accordance with the present invention, a circuit implementation of a full search block matching algorithm comprises a plurality of modules. Each module is a one-dimensional systolic array. The modules can be connected in tandem to increase the power of computation so that the best match of a current block in a search window can be obtained more rapidly without increasing the number of input ports. In particular, the error functions of a plurality of rows of positions of a current block in a search window can be computed in parallel. In an alternative embodiment, the modules can be connected in tandem to handle an increased search window size with a minimum of additional complexity and a minimum of additional input ports.

BRIEF DESCRIPTION OF THE DRAWING

FIG. 3 is a table indicating the data flow in the one dimensional systolic array module of FIG. 2.

FIG. 5 shows the data flow for the circuit of FIG. 4.

FIG. 9 is a table indicating the data flow in the circuit of FIG. 7.

FIGS. 11, 12 and 13 are tables showing the data flow in the circuit of FIG. 10.

DETAILED DESCRIPTION OF THE INVENTION

Figure 4:
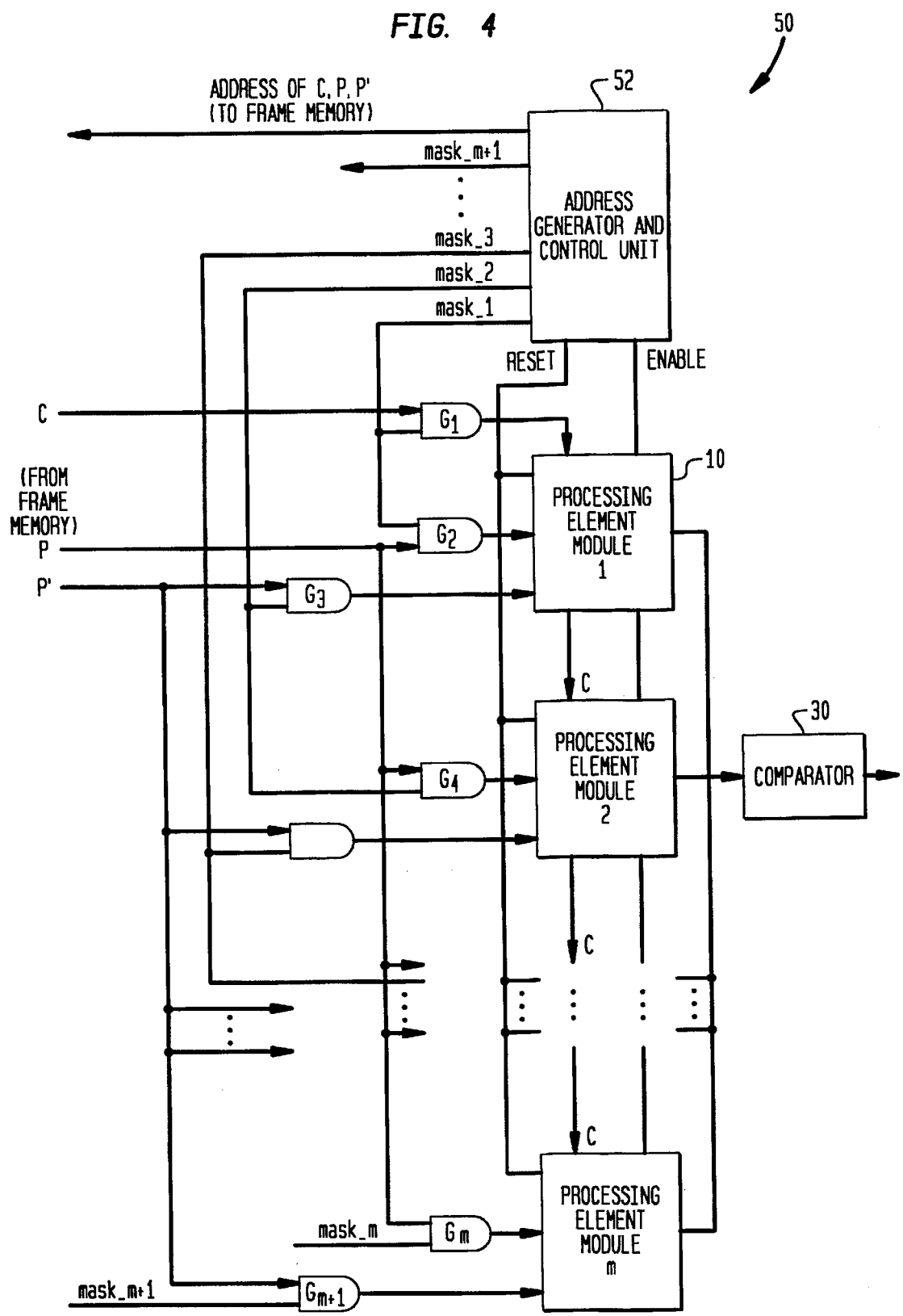
FIG. 4 shows a circuit comprising a plurality of one-dimensional systolic array modules for executing a full search block matching algorithm by calculating in parallel the error functions for a plurality of rows of positions of a current block in a search window in accordance with the present invention.

FIG. 4 shows a circuit 50 for implementing a full search block matching algorithm in accordance with the present invention. The circuit 50 of FIG. 4 computes in parallel the error functions for a plurality of rows of positions of a current block of a current video frame in a search window of a previous video frame.

Figure 2:
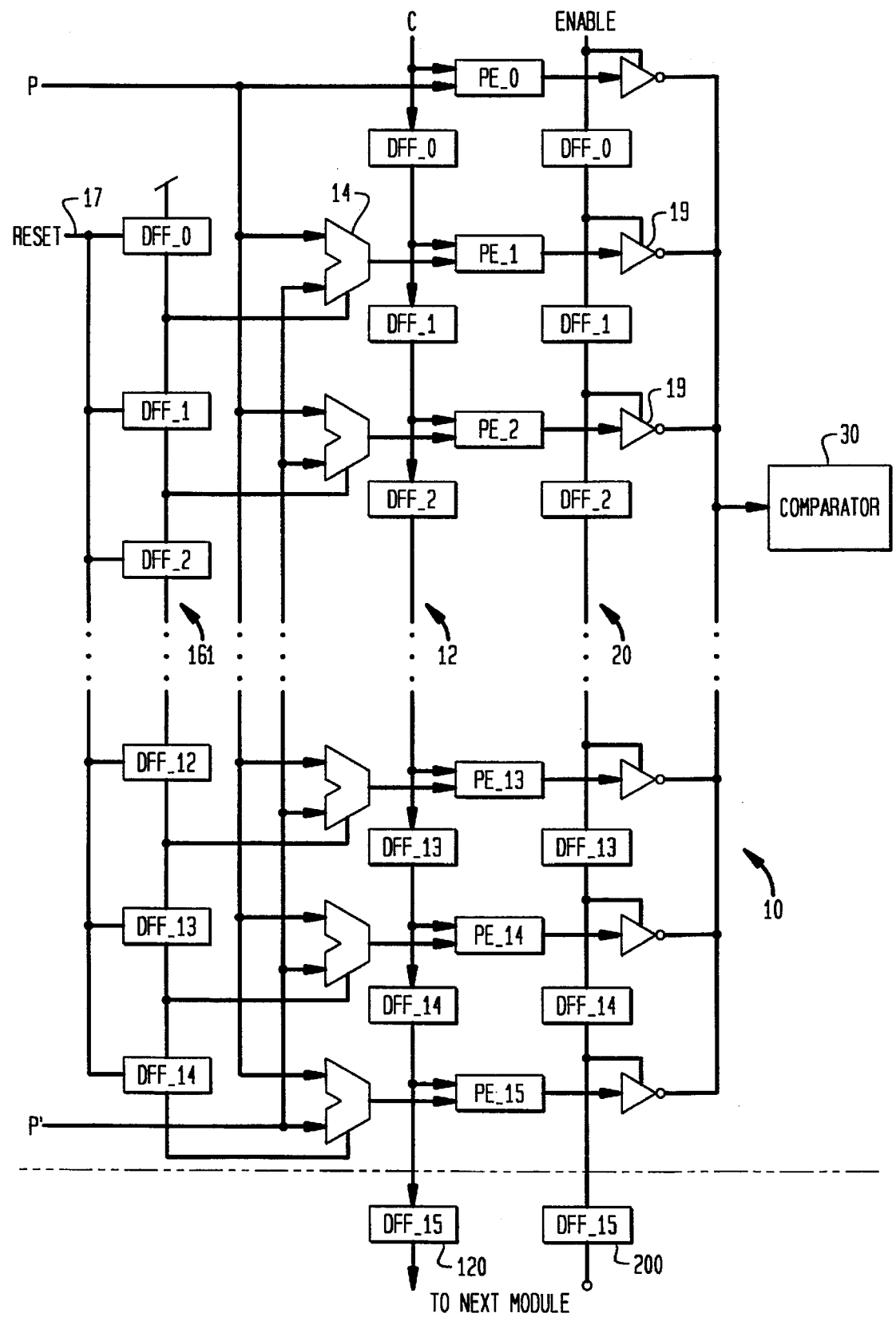
FIG. 2 shows a prior art one-dimensional systolic array module for carrying out a full search block matching algorithm.

More particularly, the circuit 50 comprises m processing element modules 10. Each of the modules 10 is one-dimensional systolic array of the type shown in FIG. 2. As there are m modules, the circuit 50 of FIG. 4 computes in parallel the error functions for m rows of positions of the current block in the search window. As indicated above, each module comprises 2p+2 processing elements.

The circuit 50 of FIG. 4 comprises three inputs C, P, P'. Thus the number of inputs of the circuit 50 of FIG. 4 is no greater than the number of inputs of an individual module 10 of FIG. 2. This means that when the circuit 50 is implemented in a single chip, an increase in processing power over that of a single module is achieved but the number of input ports is not increased.

Figure 1:
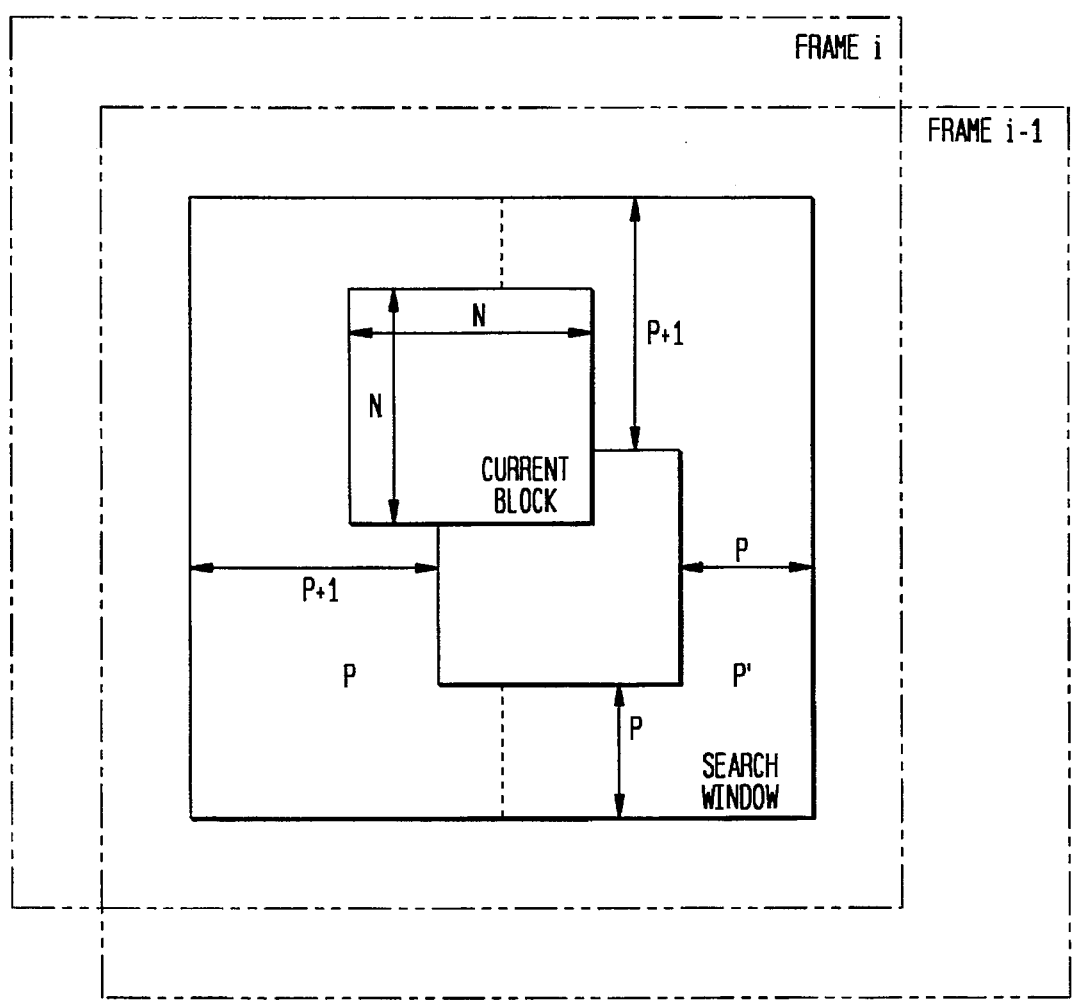
FIG. 1 shows a current block of a current video frame and a search window of a previous video frame.

The pixels a(i,j) of the current block (see FIG. 1) enters the circuit 50 via the input C. The pixels from the search window enter the circuit 50 via the inputs P and P'. Pixels from the left side of the search window (see FIG. 1) enter the circuit 50 via the input P and pixels from the righthand side of the search window enter via the input P'.

The circuit 50 includes an address generator and control unit 52. The address generator and control unit 52 generate addresses for the pixels of the current and previous frames. The addresses are transmitted to frame memories which store the current and previous frames. In response, the frame memories transmit the pixels of each current block and search window to the inputs C, P', P.

Figure 5:
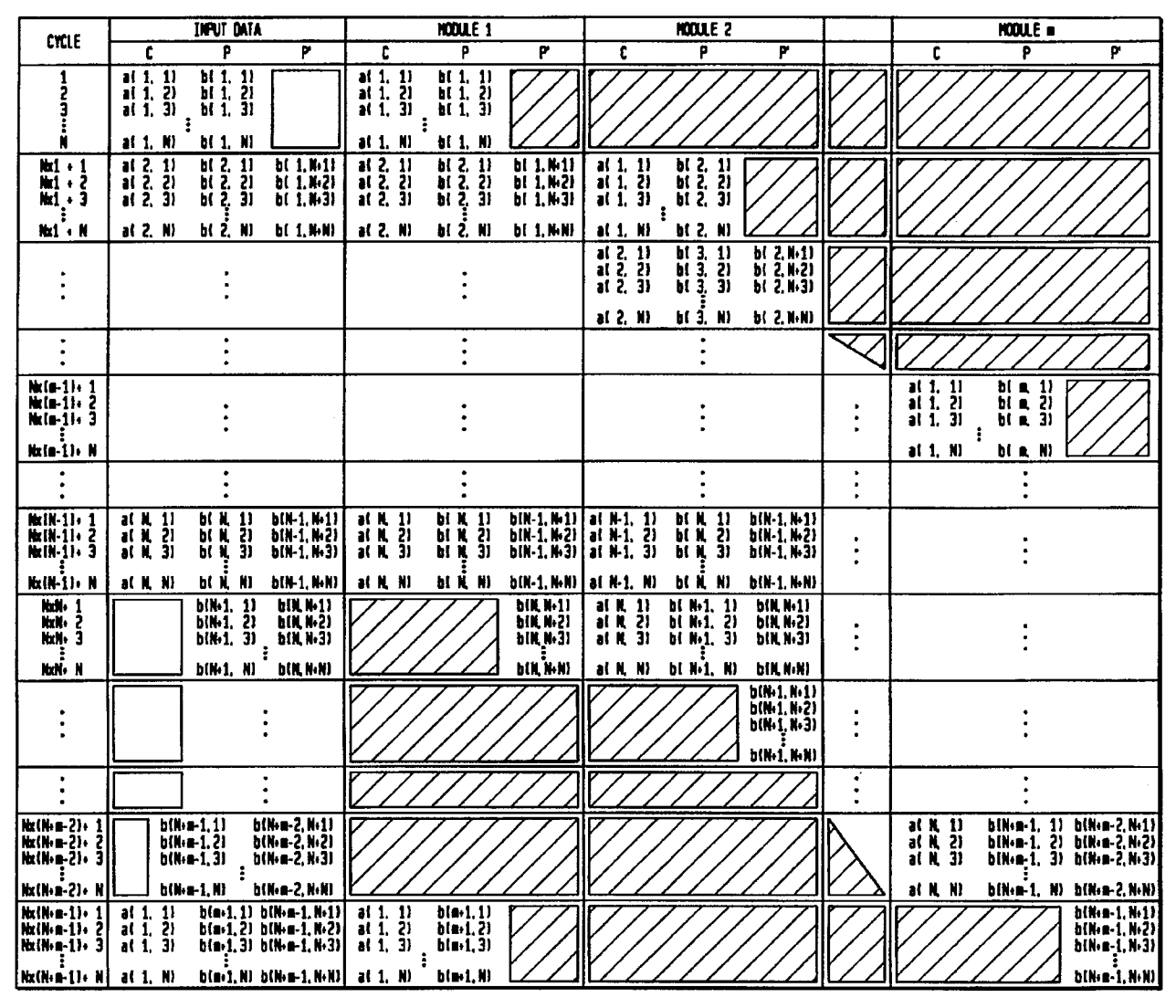

FIG. 5 shows the order in which the pixels are entered via the inputs C, P, P' for computation in parallel of the error functions for m rows of current block positions in the search window.

Figure 6:
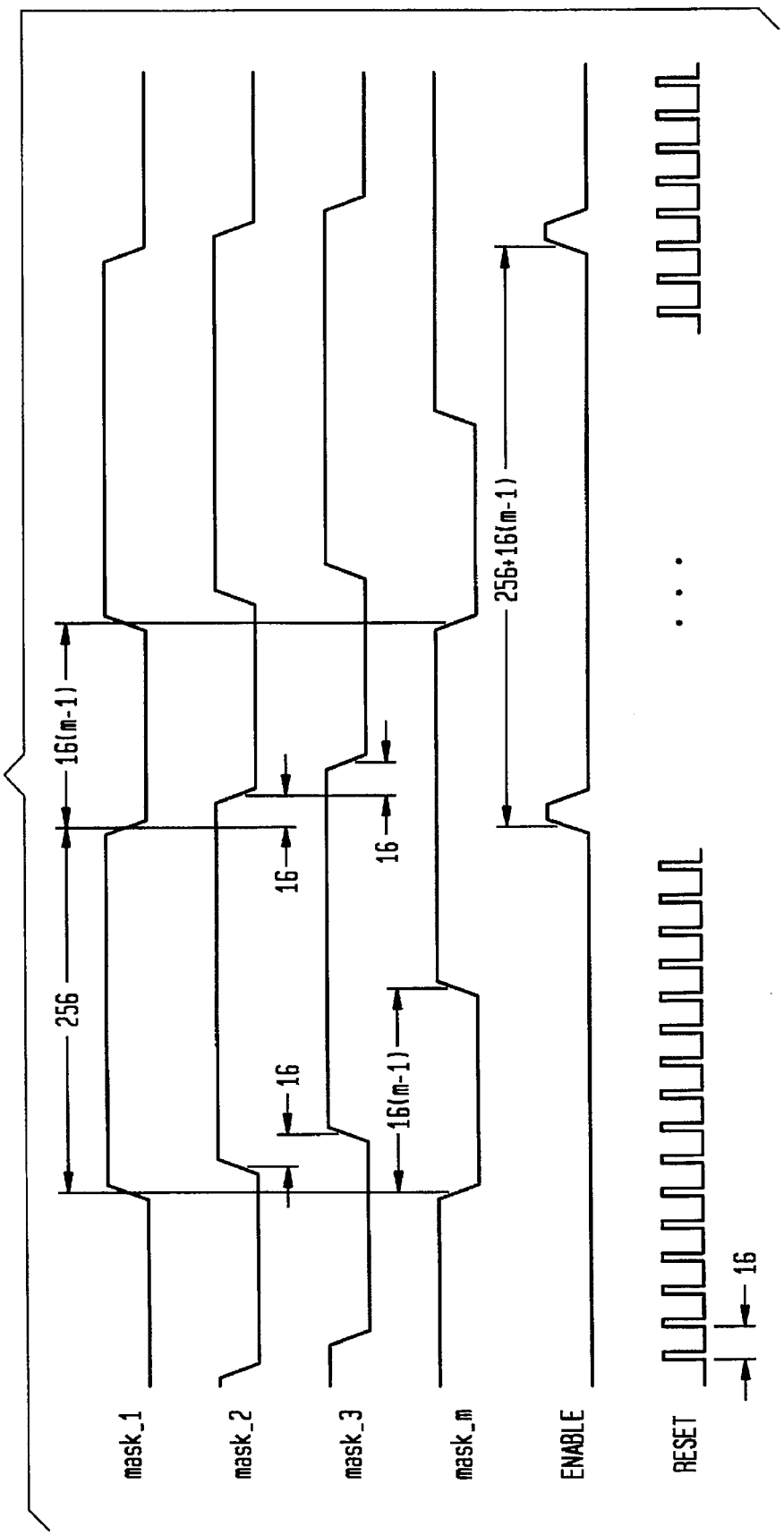
FIG. 6 is a timing diagram for a plurality of mask signals used by the circuit of FIG. 4.

The address generator and control unit 52 also generates a set of mask signals mask-1, mask-2, mask-3, ..., mask-m, mask-m+1. Each of the mask signals is shown in FIG. 6 along with a reset signal. The reset signal has a pulse every 16 cycles. Each mask signal has a logic "1" pulse for a period of 256 cycles followed by a logic "0" for 16(m−1) cycles. The inputs C, P, P' are connected to the modules 10 via the gates $G_1, G_2, G_3, \ldots, G_m, G_{m+1}$. The gates $G_1, G_2, \ldots, G_m, G_{m+1}$ receive the mask signals and thus control the transmission of particular pixels to the modules.

FIG. 5 also shows in each cycle which pixels are transmitted to the C, P and P' inputs of the individual modules 1,2, ..., m. (In the shaded area of FIG. 5, the C, P, P' inputs of the indicated modules are maintained at zero). In other words, the mask signals and gates are used to filter the pixels arriving at the inputs of the circuit 50 so that each individual module receives at its inputs only the pixels shown in FIG. 5. (It should be noted that in FIG. 5 the upper lefthand pixel of the current block has the address a(1,1) and the upper lefthand pixel of the search window has the address b(1,1). In contrast, in FIG. 3, the upper lefthand pixel of the current block has the address a(0,0) and the upper lefthand pixel of the search window has the address b(0,0)).

It should be noted that the modules 1,2, ..., m are connected in tandem. This means the last flipflop in the chain 12 of flipflops (see FIG. 2) of each module is connected via an interface flipflop 120 (see FIG. 2) to the first flipflop of the next module. Similarly, the last flipflop in the chain of flipflops 20 is connected via an interface flipflop 200 to the first flipflop of the next module.

The pixels a(i,j) of the current block enter the C input of module 1 starting at cycle 0 and propagate down the chain 12 of flipflops in each of the modules. Thus, the first current block pixel arrives at module 2 in cycle N×1+1 and arrives at module m in cycle N×(m−1)+1.

At cycle N*(N−1)+N(=256 for N=16), the first processing element of the first module completes the calculation of its error function. At the next cycle, the enable signal enables the tristate buffer 19 (see FIG. 1) associated with the first processing module, to send the first error function, to the comparator 30. In the succeeding m(2p+2)−1 cycles, each of the succeeding processing elements in the modules 1, 2, ..., m completes the calculation of its error function. The enable signal propagates down the chain of flipflops 20 in each module to enable the corresponding tristate device 19 so that the corresponding error function can be transmitted to the comparator 30. Pixel values at the input C from cycle N*N+1 to N,(N+m−2)+N can be arbitrary.

The process is repeated for each group of N+m−1 rows in the search window. It should be noted that in FIG. 5, starting in cycle N,(N+m−1)+1, pixel values are received at the input P, P', C of the circuit for the calculation of the error functions for the next set of N+m−1 rows. Thus, the data pattern of FIG. 5 repeats itself for every N+m−1 rows of the search window, with the vertical coordinate being increased by N+m−1 for successive groups of N+m−1 rows of the search window.

Figure 7:
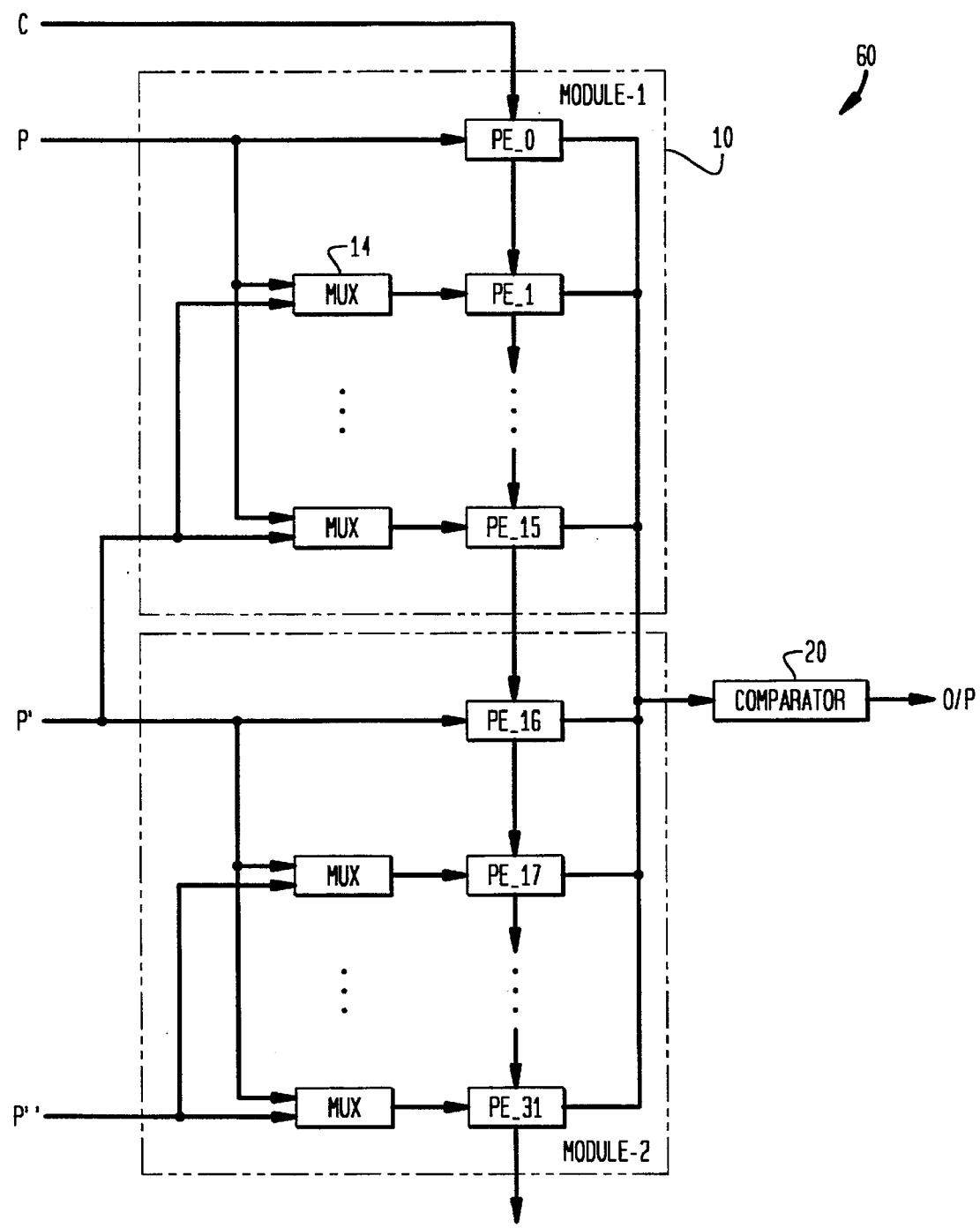
FIG. 7 shows a circuit comprising a plurality of systolic array modules for executing a full search block matching algorithm using a search window of increased size in accordance with the invention.

FIG. 7 is an alternative circuit for implementing a full search block matching algorithm in accordance with the invention. The circuit 60 of FIG. 7 also comprises two modules 10 connected in tandem (Note that in FIG. 7, the processing element PE-1 of the module 1 is shown as being connected to the processing element PE-16 which is the first processing element of the second module. However, in reality, it is the associated flipflops in the chain 12 that are connected.)

The purpose of the circuit 60 of FIG. 7 is to increase the size of the search window. The circuit 50 of FIG. 4 is used in a search window of size $(2p+1+N)^2$ wherein the number of processing elements in each module is 2p+2. The circuit 60 of FIG. 7 is designed to handle a search window which is increased by 2(p+1) pixels in each dimension in comparison with the search window of FIG. 1.

Figure 8:
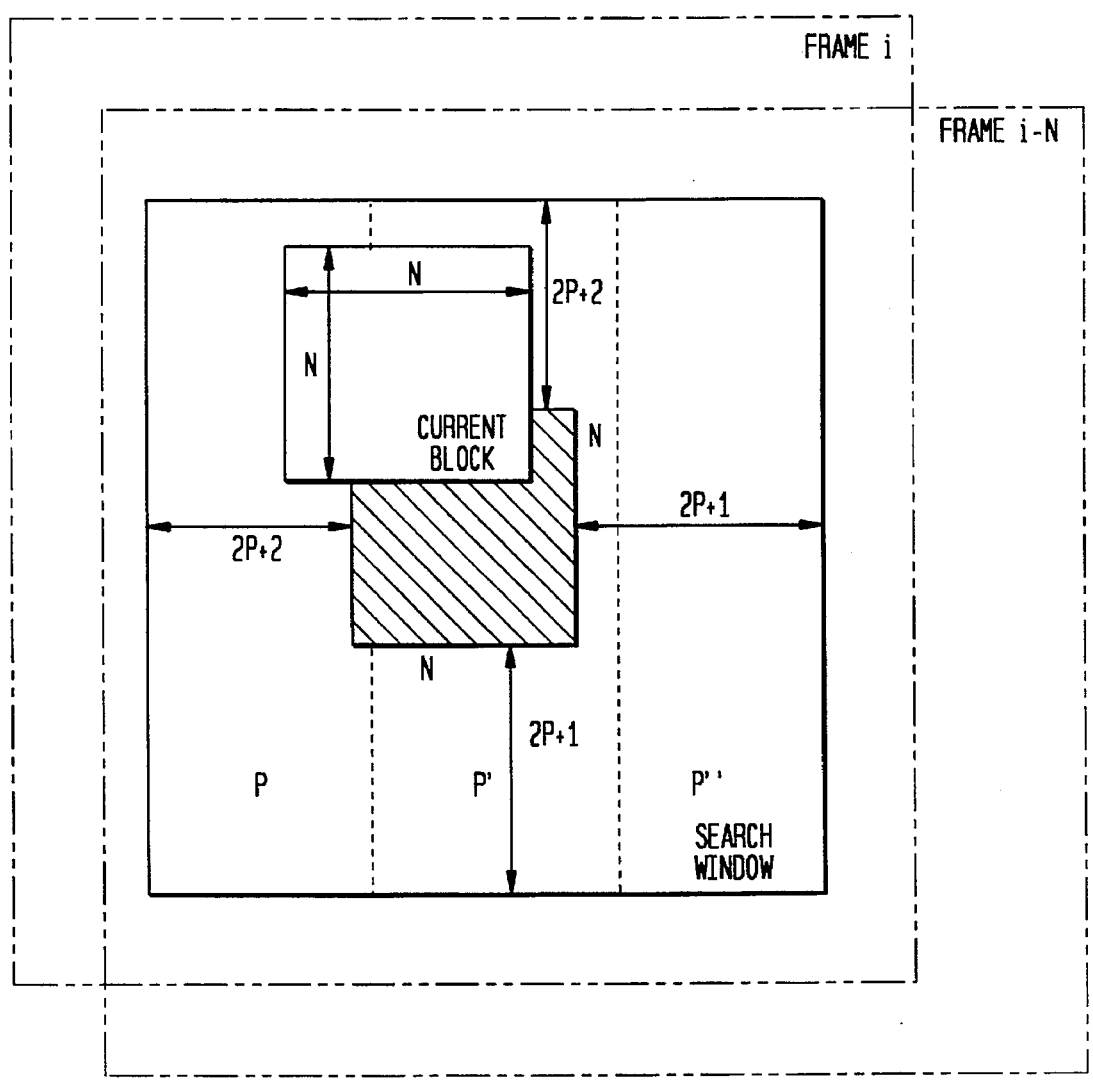
FIG. 8 illustrates a search window of increased size.

The search window of increased size is illustrated in FIG. 8. More particularly, FIG. 8 shows an N×N current block (e.g., N=16) in a current video frame i and a search window in a previous frame. The dimensions of the search window of FIG. 8 are, as indicated above, of an enlarged size.

The circuit 60 of FIG. 7 has four inputs C, P, P', P" rather than three inputs in the circuit 50. The additional input P" is introduced to improve the data processing efficiency of the circuit 60. The input C receives the pixels of the current block. The inputs P, P', and P" receive pixels from the search window. As shown in FIG. 8, the search window of enlarged size is divided into three portions. Each of the inputs P, P', P" of FIG. 7 receives pixels from the corresponding search window portion as shown in FIG. 8.

The two modules 10 which form the circuit 60 cooperate to calculate in parallel the error functions for one row of positions of the current block in the extended size search window of the previous frame. Each of the processing elements in the two tandemly connected modules calculates the error function for one position in a row of positions of the current block in the search window.

FIG. 9 shows the particular pixels which are present at the inputs C, P, P', and P" at each cycle during the calculation of the error functions for the topmost row of positions of the current block in the search window. Again the pixels of the current frame are received serially at the input C and propagate down the chain from one processing element to the next in the tandemly connected modules. The pixels received at the inputs P and P' are broadcast to selected processing elements in both of the modules 10 according to the state of the multiplexers 14 (see FIG. 2). Similarly, pixels received at the input P" are broadcast to selected processing elements in the second module depending on the state of the multiplexers 14 in the second module.

For each successive row of positions of the current block in the search window, the pattern of FIG. 9 repeats itself.

In the circuit of FIG. 7 additional modules may be connected in tandem. Each such additional module enables the search window dimensions to be increased by 2(p+1) pixels in each direction. In general, if the circuit comprises n+1 tandemly connected modules, the search window may have dimensions of {N+(2n+2)p+2n+1} pixels per row. The number of inputs for the search window pixels is n+2. Only one extra input needs to be added to the circuit with the addition of each extra module. This is a strong advantage when the circuit is implemented on a chip.

To review briefly, FIG. 4 illustrates a circuit 50 for implementing a block matching algorithm in which a plurality of prior art modules are connected to increase the computation power. In particular, the circuit 50 of FIG. 4 calculates in parallel error functions for m rows of positions of the current block in a search window. FIG. 7 on the other hand, illustrates a circuit 60 for implementing a block matching algorithm in which a plurality of modules are connected so as to permit an increase in size in the search window.

Figure 10:
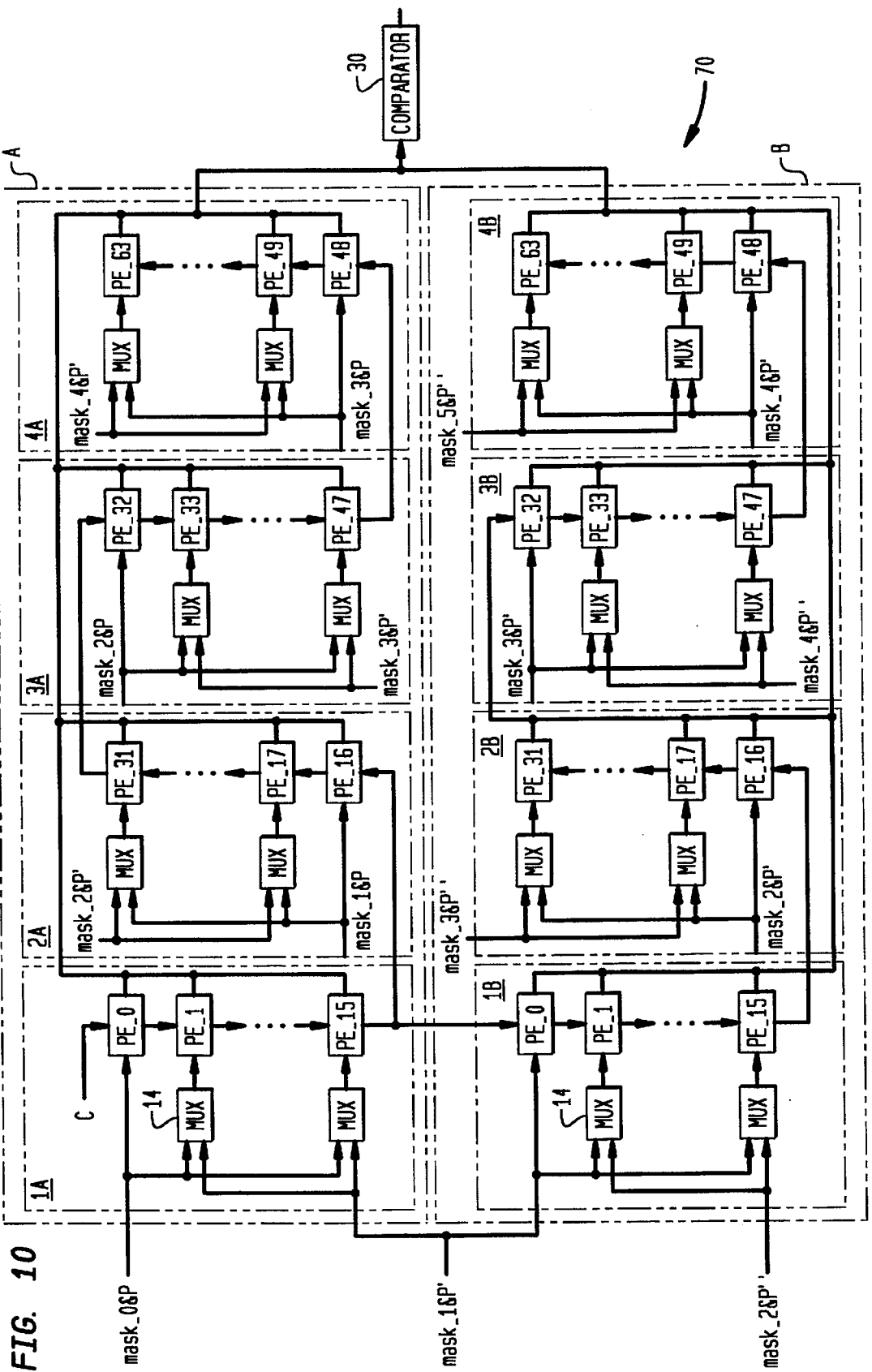
FIG. 10 shows a circuit comprising a plurality of systolic array modules for implementing a full search block matching algorithm with increased computational power and increased search window size in accordance with the invention.

FIG. 10 illustrates a circuit for implementing a full search block matching algorithm in which the error functions are calculated in parallel for a plurality of rows of positions of the current block in the search window and in which the search window is of increased size.

The circuit 70 of FIG. 10 comprises two sets of modules A and B. Each set A,B contains four modules. The modules of the set A are labeled 1A, 2A, 3A, 4A. The modules of the set B are labeled 1B, 2B, 3B, 4B. Each module comprises a one dimensional systolic arrays of processing elements of the type described above in connection with FIG. 2.

The modules of the set A are connected in tandem - i.e., the last processing element of each module is connected to the first processing element of the next module. The modules of the set B are also connected in tandem. In addition, the last processing element PE-15 of module 1A is connected to the first processing element PE-0 of the module 1B. Illustratively, each module comprises 16 processing elements. Thus, there is a total of 64 processing elements PE-0, ..., PE-63 in each set. The circuit 70 has an input C for receiving pixels of the current block and three inputs P, P', and P" for receiving pixels from the search window (see FIG. 7). FIG. 11 shows which pixels arrive at the inputs during each cycle, for the calculation of the first m=4 rows of error functions, for an N×N (N=16) current block and a search window of size {(2p+1+2(p+1)+N} where N=2p+2.

The pixels of the current block enter the processing element PE-0 of the module 1A serially in raster scan order starting at cycle zero. The pixels of the current block propagate serially from PE-0 to PE-63 in the modules of set A with each pixel advancing one processing element in each cycle. The pixels of the current block enter the processing element PE-0 of module 1B in serial order after leaving the processing element PE-15 of the module 1A. Then the pixels propagate serially from the processing element PE-0 to the processing element PE-63 of the set B.

The pixels from the search window are filtered by the mask signals mask-0, ..., mask-5 (see FIG. 5) before entering the modules 1A, 2A, 3A, 4A, 1B, 2B, 3B, 4B. Within each module, the state of a multiplexer 14 determines which pixel (P or P' in the A module P' or P" in the B module) is sent to the processing element.

FIG. 12 shows which pixels arrive at each module in set A in each cycle and FIG. 13 shows which pixels arrive at each module in set B in each cycle for the calculation of the first four rows of error functions.

Finally, the above-described embodiments of the invention are intended to be illustrative only. Numerous alternative embodiments may be devised by those skilled in the art without departing from the scope of the following claims.

We claim:

1. A full search block matching circuit comprising:

a plurality of m(m>1) modules connected in tandem, each of said modules comprising a one-dimensional array of processing elements, a first input for inputting pixel values from a block of pixels in a current video frame in a predetermined sequence to said modules, a second input for inputting pixel values from a search window of a previous video frame in a predetermined sequence to said modules, a control circuit for generating a stream of mask signals for each of said modules, and at least one gate circuit for receiving said pixels from said first and second inputs and said mask signals, and for selectively transmitting particular pixels inputted at said inputs to particular ones of said modules such that each one of said modules being enabled for equal, staggered periods of time.

2. The circuit of claim 1 wherein each of said modules determines error functions for one row of positions of the current block in the search window and said circuit determines in parallel the error functions for m rows of positions of the current block in the search window.

3. A full search block matching circuit comprising:

a plurality of m(m>1) modules connected in tandem, each of said modules comprising a one-dimensional array of processing elements, a first input for inputting pixel values from a block of pixels in a current video frame in a predetermined sequence to said modules, a second input for inputting pixel values from a search window of a previous video frame in a predetermined sequence to said modules, a control circuit for generating a mask signal for each of said modules, and a gate circuit for receiving said pixels from said first and second inputs and said mask signals for selectively filtering the transmission of particular pixels inputted at said inputs to particular ones of said modules wherein said current block comprises N×N pixels, said search window comprises $(2p+1+N)^2$ pixels, where $N=2p+2$, and each of said modules comprises $2p+2$ processing elements.

4. The circuit of claim 1 wherein said second input means comprises one input for receiving pixels from a first portion of said search window and a second input for receiving pixels from a second portion of said search window.

5. The circuit of claim 4 wherein said gate means comprises two gates associated with each module for selectively enabling pixels from the first and second search window portions to be transmitted to the associated module under the control of said mask signals.

6. The circuit of claim 5 wherein the pixels of said current block are transmitted serially from one processing element to the next in the series of processing element formed by said modules connected in tandem and wherein said pixels of said search window are selectively broadcast to particular processing elements of said modules.

7. A full search block matching circuit comprising:

a plurality of m modules connected in tandem, each of said modules comprising a one dimensional systolic array, and a first pixel input for transmitting to said m modules pixels C from a current block of a current video frame, a second pixel input for transmitting to said m modules pixels P from a left-side area of a search window or previous frame having said left-side area and a right-side area, a third pixel input for transmitting to said m modules pixels P' from the right-side area of said search window or a previous frame, wherein said pixels C, P and P' are transmitted in a predetermined sequence for enabling said plurality of m modules to determine the errors for m rows of positions of the current block in the search window in parallel.

8. A full search block matching circuit for a current block of pixels having N pixels in each row of a current video frame in a search window of a previous video frame having $\{N+(2n+2)p+2n+1\}$ pixels per row, where $n \geq 1$, and $p \geq 1$ comprising:

a plurality of n+1 modules connected in tandem, each of said n+1 modules comprising a one-dimensional systolic array of $2p+2$ processing elements for computing an error function, a first input for inputting said pixels of said current block to said modules, and a second input comprising n+2 distinct inputs for inputting said search window pixels to said modules, each of said distinct inputs inputting pixels from a distinct portion of said search window.

9. The circuit of claim 8 wherein n=1, the number of modules connected in tandem is two, and wherein the second input means comprises three distinct inputs.

10. The circuit of claim 8 wherein said n+1 modules compute in parallel the error functions for one complete row of positions of the current block in the search window.

11. A full search block matching circuit comprising:

a first module comprising a one-dimensional systolic array of processing elements which is able by itself to compute in parallel the error functions for one row of positions of a current block of pixels of a current video frame in a search window of a first predetermined size of a previous video frame, a second module comprising a one-dimensional systolic array of processing elements connected in tandem to said first module, said first and second modules cooperating to compute in parallel one row of positions of said current block in a search window of a second predetermined size larger than said first predetermined size having a left-side area, a middle area and a right-side area, and wherein said circuit includes a first input for inputting pixels of said current block to said modules and second, third, and fourth inputs for inputting, to said modules, pixels from the left-side area, the middle area, and the right-side area of said search window of said second size, respectively.

12. The circuit of claim 11 wherein pixel data from said current block is passed sequentially from one processing element to the next in said first and second tandemly of connected modules and wherein pixel data from said search window of said second size is selectively broadcast to said processing elements of said first and second modules.

13. The circuit of claim 11 further comprising one or more additional modules comprising a one-dimensional systolic array connected in tandem to said first and second modules, wherein said additional modules cooperate with said first and second modules to compute in parallel one row of positions of said current block in a search window of a size larger than said second size.

14. A full search block matching circuit comprising:

a first module comprising a one-dimensional systolic array which is able by itself to compute in parallel the error functions for one row of positions of a current block of pixels of a current video frame in a search window for a first predetermined size of a previous video frame, and a second module comprising a one-dimensional systolic array of processing elements connected in tandem to said first module, said first and second modules cooperating to compute in parallel one row of positions of said current block in a search window of a second predetermined size larger than said first predetermined size, wherein said circuit includes a first input for inputting pixels of said current block to said modules and includes second, third, and fourth inputs for inputting to said modules pixels from three distinct areas of said search window of said second size, and wherein each systolic array comprises 2p+2 processing elements, where p≧1, said current block has N pixels in each row, where N=2p+2, said search window of a first predetermined size has 2p+1+N pixels in each row, and said search window of a second size has 2p+1+N+2(p+1) pixels in each row.

15. A full search block matching circuit comprising:

a first module comprising a one-dimensional systolic array which is able by itself to compute in parallel the error functions for one row of positions of a current block of pixels of a current video frame in a search window of a first predetermined size of a previous video frame, a second module comprising a one-dimensional systolic array of processing elements connected in tandem to said first module, said first and second modules cooperating to compute in parallel one row of positions of said current block in a search window of a second predetermined size larger than said first predetermined size, and one or more additional modules comprising a one-dimensional systolic array connected in tandem to said first and second modules, wherein each said additional modules cooperate with said first and second modules to compute in parallel one row of positions of said current block in a search window of a size larger than said second predetermined size, wherein said circuit includes a first input for inputting pixels of said current block to said modules and includes second, third, and fourth inputs for inputting to said modules pixels from three distinct areas of said search window of said second size, and wherein each module comprises 2p+2 processing elements, where p≧1, and each additional module enables the number of pixels in a row of the search window to be increased by 2(p+1).

16. A full search block matching circuit comprising:

a first plurality of modules connected in tandem, a second plurality of modules connected in tandem, each of said modules in said first and second pluralities comprising a one-dimensional systolic array of processing elements, each of said modules including means for receiving pixels of a current block of a current video frame, said pixels of said current block being transmitted serially from one processing element to the next in said first plurality of tandemly connected modules, and being transmitted serially from one processing element to the next in the second plurality of tandemly connected modules, the first processing element of the first module in the second plurality serially receiving said current frame pixels after the last processing element of the first module in the first plurality, and each of said modules including means for receiving selected pixels of a search window of a previous video frame at selected times under the control of mask signals.

17. The circuit of claim 16 wherein said modules determine in parallel the error functions of a plurality of rows of positions of the current block in said search window.

18. The circuit of claim 17 wherein said circuit includes first, second, and third inputs for receiving pixels from first, second and third different portions of said search window, search window pixels from said first and second inputs being selectively transmitted to the modules in the first plurality under the control of said mask signals, and search window pixels from said second and third inputs being selectively transmitted to said modules of said second plurality under the control of said mask signals.

19. A full search block matching circuit comprising:

a first plurality of modules connected in tandem, a second plurality of modules connected in tandem, each of said modules in said first and second pluralities comprising a one-dimensional systolic array of processing elements, each of said modules including means for receiving pixels of a current block of a current video frame, said pixels of said current block being transmitted serially from one processing element to the next in said first plurality of tandemly connected modules, and being transmitted serially from one processing element to the next in the second plurality of tandemly connected modules, the first processing element of the first module in the second plurality serially receiving said current frame pixels after the last processing element of the first module in the first plurality, each of said modules including first, second, and third inputs for receiving pixels from first, second and third different portions of said search window, wherein search window pixels from said first and second inputs are selectively transmitted to the modules in the first plurality under the control of said mask signals, and search window pixels from said second and third inputs are selectively transmitted to said modules of said second plurality under the control of said mask signals, and each of said modules determining in parallel the error functions of a plurality of rows of positions of the current block in said search window wherein said current block comprises N pixels in each row, each of said modules comprises 2p+2 processing elements, wherein p≧1, and said second plurality of modules enabling the number of pixels in a row of the search window to be increased by 2(p+1).

20. A full search block matching circuit comprising:

a plurality of m(m>1) modules connected in tandem, each of said modules comprising a one-dimensional array of processing elements, a first input for inputting pixel values from a block of pixels in a current video frame in a predetermined sequence to said modules, second, third and fourth inputs for inputting pixel values from a respective left-side area, middle area and right-side area of a search window of a previous video frame in a predetermined sequence to said modules, a control circuit for generating a stream of mask signals for each of said modules, and at least one gate circuit for receiving said pixels from said first and second inputs and said mask signals, and for selectively transmitting particular pixels inputted at said inputs to particular ones of said modules such that each one of said modules being enabled for equal, staggered periods of time.

21. A full search block matching circuit comprising:

a first plurality of m(m>1) modules connected in tandem, a second plurality of m modules connected in tandem, each of said modules in said first and second pluralities comprising a one-dimensional systolic array of processing elements, an input for transmitting, to said modules in said first and second pluralities of m modules, pixels from a current block of a current video frame and pixels from a search window of a previous video frame, the modules of said first and second pluralities of modules determining in parallel error functions for m rows of positions of the current block in the search window, wherein each module comprises 2p+2 processing elements, where $p \geq 1$, and said second plurality of modules enabling the number of pixels in each row of the search window to increase by 2(p+1).

22. The circuit of claim 21 wherein said input means comprises first, second and third inputs for selectively broadcasting pixels from first, second and third portions of said search window to the processing elements of said modules under the control of mask signals.

23. The circuit of claim 22 wherein said pixels of said current block are transmitted serially from one processing element to the next in said systolic arrays of said first plurality and are transmitted serially from one processing element to the next in said systolic arrays of said second plurality, the first processing element of first systolic array of said second plurality receiving each of said current block pixels after a last processing element of a first systolic array of the first plurality.

24. The circuit of claim 11, wherein said second input inputs pixels to said first module, said third input inputs pixels to said first and second modules, and said fourth input inputs pixels to said second module.

* * * * *